(12) United States Patent
Chou et al.

(10) Patent No.: US 7,633,269 B2
(45) Date of Patent: Dec. 15, 2009

(54) CHARGING METHOD AND SYSTEM THEREOF

(75) Inventors: Yuh-Fwu Chou, Hsinchu (TW); Bing-Ming Lin, Hsinchu (TW); Po-Yin Tseng, Miaoli (TW); Kuo-Kuang Peng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 234 days.

(21) Appl. No.: 11/016,718

(22) Filed: Dec. 21, 2004

(65) Prior Publication Data

US 2005/0140333 A1     Jun. 30, 2005

(30) Foreign Application Priority Data

Dec. 26, 2003   (TW) ............................. 92137064 A (51) Int. Cl.
  *H02J 7/04*   (2006.01)
  *H02J 7/16*   (2006.01)
(52) U.S. Cl. ...................... 320/162; 320/164; 320/119

(58) Field of Classification Search ......... 320/116–122, 320/132, 136, 162–164
See application file for complete search history.

(56) References Cited

U.S. PATENT DOCUMENTS

| | | | |
|---|---|---|---|
| 5,654,622 A | | 8/1997 | Toya et al. |
| 5,677,613 A | * | 10/1997 | Perelle ....................... 320/122 |
| 6,268,710 B1 | * | 7/2001 | Koga ........................... 320/116 |
| 6,373,224 B1 | * | 4/2002 | Goto et al. ................... 320/119 |
| 6,961,592 B2 | * | 11/2005 | O'Connor .................... 455/572 |

* cited by examiner

*Primary Examiner*—Bao Q. Vu
*Assistant Examiner*—Jue Zhang
(74) *Attorney, Agent, or Firm*—Birch, Stewart, Kolasch & Birch, LLP (57) ABSTRACT

A charging method for charging a battery module. The battery module receives a different charge voltage according to the voltage or current status of the battery module. The charge voltage is decreased to increase battery power when any battery voltage level is greater than a preset voltage. A charging system thereof is also disclosed.

16 Claims, 8 Drawing Sheets

FIG. 1a

RELATED ART

FIG. 1b

RELATED ART

CHARGING METHOD AND SYSTEM THEREOF

BACKGROUND OF THE INVENTION

1. Field of the Invention

The invention relates to a charging method, and more particularly to a charging method and system for charging a battery module.

2. Brief Description of the Related Art

Figure 1A:
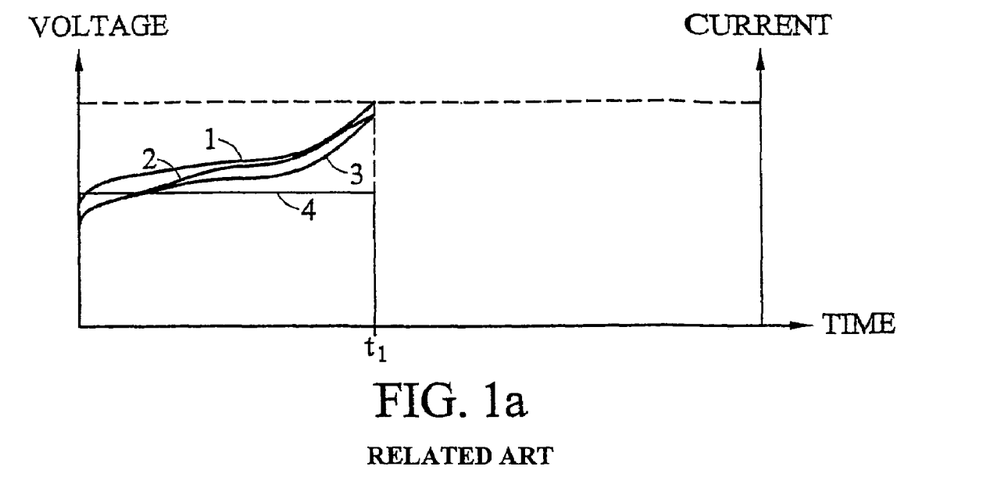
FIGS. 1a and 1b show the status of batteries as they are charged utilizing the limited-current charging method.
Figure 1B:
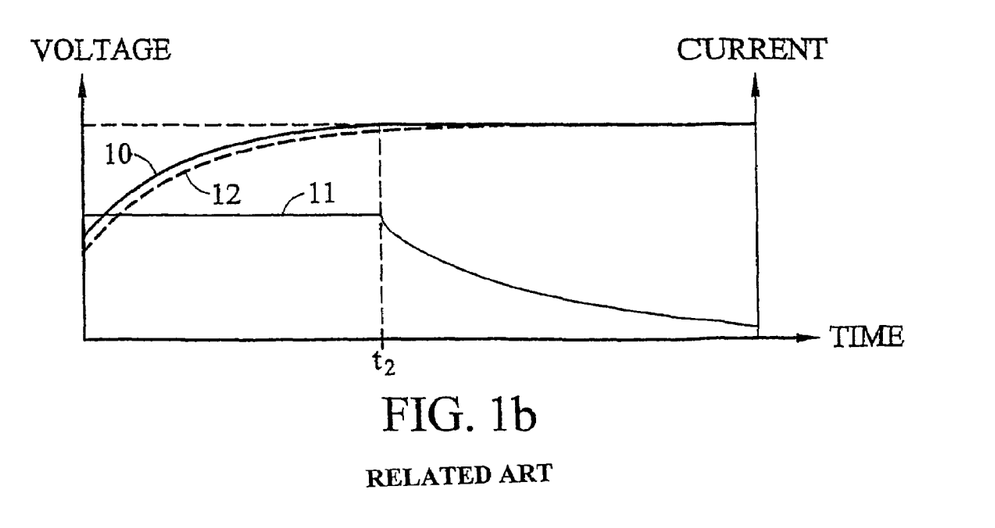

Conventional methods for charging batteries include limited-current charging, pulse charging, and multistage constant-current charging. FIGS. 1a and 1b show the status of batteries as they are charged utilizing the limited-current charging method.

As shown in FIG. 1a, since the batteries are not balanced, output voltages 1 to 3 of different batteries are different. A power supply provides a charge current 4 to the batteries according to the limited-current charging method. Before time $t_1$, the power supply provides the constant charge current 4 to the batteries. When the output voltage arrives at a preset voltage, the power supply stops providing the charge current. In the limited-current charging method, only one battery is fully charged while the others are not.

As shown in FIG. 1b, all the batteries are balanced such that output voltages therefrom are almost equal. Thus, a curve 10 represents an output voltage. Before time $t_2$, the power supply provides constant charge current 11 to the batteries. After time $t_2$, when the output voltage 10 arrives at a preset voltage, the charge current 11 is reduced according to a voltage difference between a power supply and the batteries. When the voltage difference is less, the charge current is lower. Although the output voltage 10 arrives at the preset voltage, the power supply still provides the lower charge current to the batteries. Thus, all the batteries are fully charged but the charge time is increased.

When the batteries are continuously idle for thirty minutes, a relaxed battery voltage will be as the curve 12 shown in FIG. 1b. The power supply provides the charge current according to the open-circuit voltage.

Figure 2:
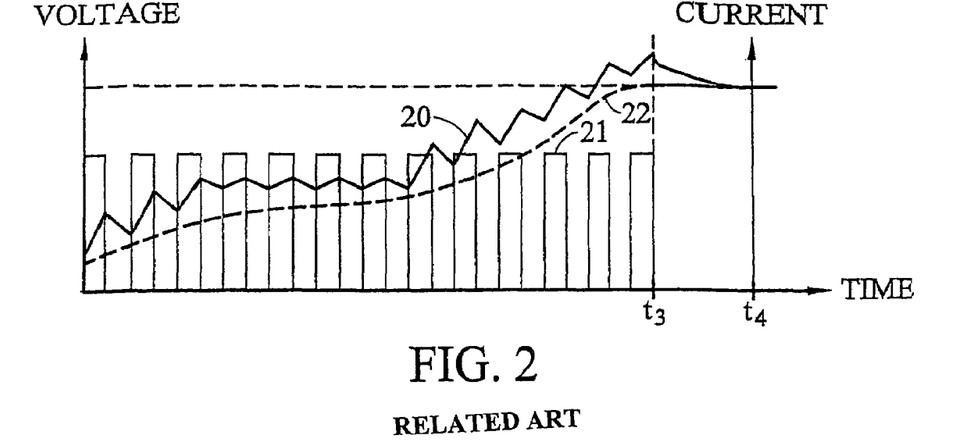
FIG. 2 shows the status of batteries as they are charged utilizing the pulse charging method.

FIG. 2 shows the status of batteries as they are charged utilizing the pulse charging method. All the batteries are balanced such that output voltages from the batteries are the same shown as curve 20. A power supply provides a pulse charge current 21 to the batteries. Relaxed battery voltage 22 is undetectable when the batteries are charged by the pulse charging method. Therefore the relaxed battery voltage 22 may easily exceed a preset voltage as shown at time $t_3$ in FIG. 2, causing danger. At timing $t_3$, the power supply stops charging the batteries, and at time $t_4$, an output voltage is detected. An interval about 30 minutes between time $t_3$ and $t_4$ is generally required. In other words, the pulse charging method cannot immediately detect output voltages.

Figure 3:
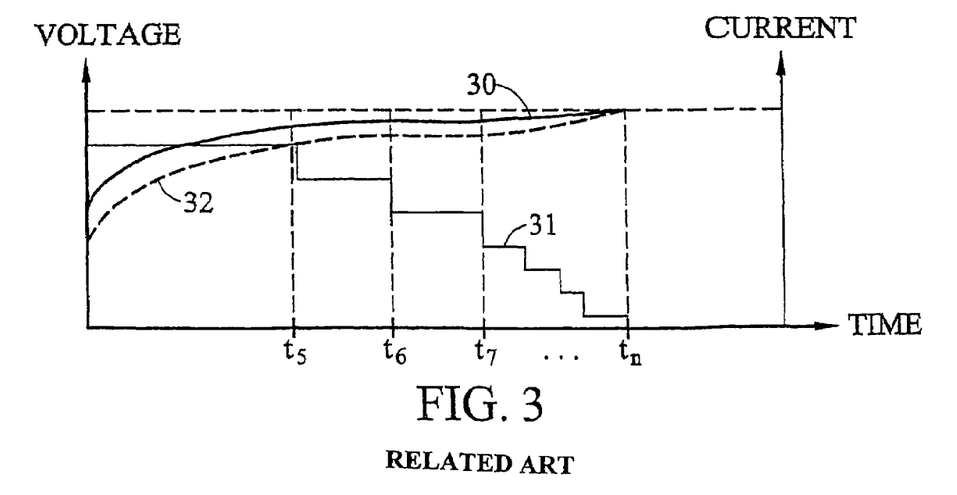
FIG. 3 shows the status of batteries as they are charged utilizing the multistage constant-current charging method.

FIG. 3 shows the status of batteries as it is charged utilizing the multistage constant-current charging method. A power supply provides a varied charge current 31 for the batteries according to output voltages 30. Curve 32 shows a relaxed battery voltage. Since this method provides varied constant charge currents, the charge control circuit is complex and costly.

Conventional charging methods have different drawbacks. In the limited-current charging method, when batteries are not balanced, only one battery is fully charged and when batteries are balanced, the charge time is longer. In the pulse charging method, output voltage is not immediately detected and charge time is difficult to control. In the multistage constant-current charging method, the charge control circuit is complex and costly.

SUMMARY

An embodiment of the present invention provides a method for charging a battery module containing batteries connected in series. First, a voltage is provided to charge the battery module for a period of time. The batteries are individually monitored to obtain respective battery status during charging the battery module. The charging voltage is varied according to the individual battery status and continuously provided to the battery module. Charging of the battery module stops when the status of one battery meets a predetermined requirement.

An embodiment of the invention additionally provides a system, for charging a battery module containing batteries connected in series, wherein each battery has an individual battery voltage. The charging system comprises a power supply circuit and a charge management circuit. The power supply circuit outputs a charge voltage. The charge management circuit is coupled between the power supply circuit and the battery module for conveying the charging voltage to the battery module. The charge management circuit individually monitors the batteries and obtains the individual battery status respectively during charging the battery module. The charge management circuit varies the charge voltage according to the individual battery status.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

During a period of time, a charger provides a voltage to charge a battery module comprising batteries connected in series. Each battery in the battery module has a battery voltage level. The original charge voltage is set to be appropriately larger than the sum of the individual battery voltage levels. The charger detects each battery status and changes the charge voltage accordingly.

When a first battery voltage level among the battery voltage levels detected by the charger arrives at a first preset voltage, the charger decreases the charge voltage and then determines whether to increase or decrease the charge voltage according the individual battery statuses, such as battery voltage level or current.

When the sum of the battery voltage levels has not reached a second preset voltage, the charge voltage is decreased. Therefore, each battery voltage level is slightly reduced but the charger continues to provide a charge current to the battery module. It is possible that battery voltage levels may be slightly lowered due to a decreased temperature or chemical diffusion balance inside each battery, and then the charge voltage can be increased accordingly. When the sum of the battery voltage levels reaches the second preset voltage, the charger stops increasing the charge voltage.

The charge current through the battery module can also determine whether to increase or decrease the charge voltage. When a battery voltage level reaches the first preset voltage and the charge current has not reached a first preset current, the charge voltage is decreased to prevent over charging of any one battery.

If a battery voltage level reaches the first preset voltage and the charge current arrives at the first preset current, the charge voltage is increased and the first preset current is decreased. When the charge current and first preset current are less than a second preset current, the charger stops providing the charge voltage.

Figure 4:
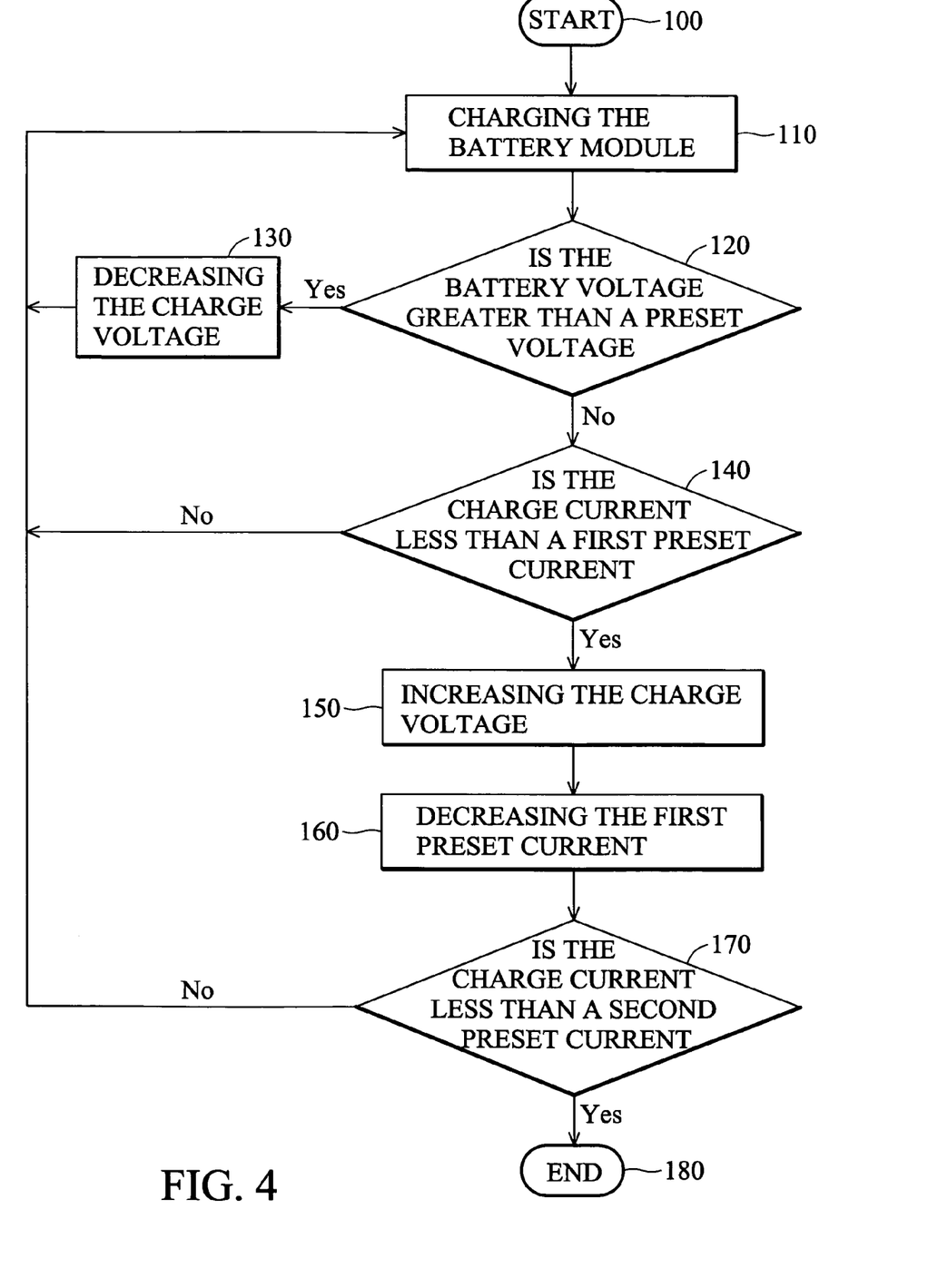
FIG. 4 is a flowchart according to an embodiment of the invention.

FIG. 4 is a flowchart according to an embodiment of the invention. In this embodiment, a charger varies a charge voltage according to a charge current through a battery module comprising batteries connected in series. Each battery has a battery voltage level.

The charger proceeds with charging operation in step 100. The charger provides a charge voltage to the battery module in step 110. The initial charge voltage can be set according to a total voltage target of the battery module The charger detects each battery voltage level in step 120. When a battery voltage level is greater than a first preset voltage, the charge voltage is decreased in step 130 and the process returns to step 110. In order to decrease the charge current, the charge voltage is decreased.

If no battery voltage levels are greater than the first preset voltage and the charge current is not less than a first preset current in step 140, the process returns to step 110. If no battery voltage level is greater than the first preset voltage but the charge current is less than the first preset current, the charge voltage is increased in step 150 to reduce the charge time. The first preset current is decreased in step 160. By executing step 160, the battery module has more time to stabilize or balance the cells and then be capable of receiving a higher charge voltage, so the final total voltage level of the battery module could be nearly 100 percent of the capacity thereof. If step 160 is omitted, the charger can still complete the charging operation.

If the charge current is less than a second preset current, the charger stops providing the charge voltage in step 180. If the charge current is not less than a second preset current, the process returns to step 110.

Figure 5:
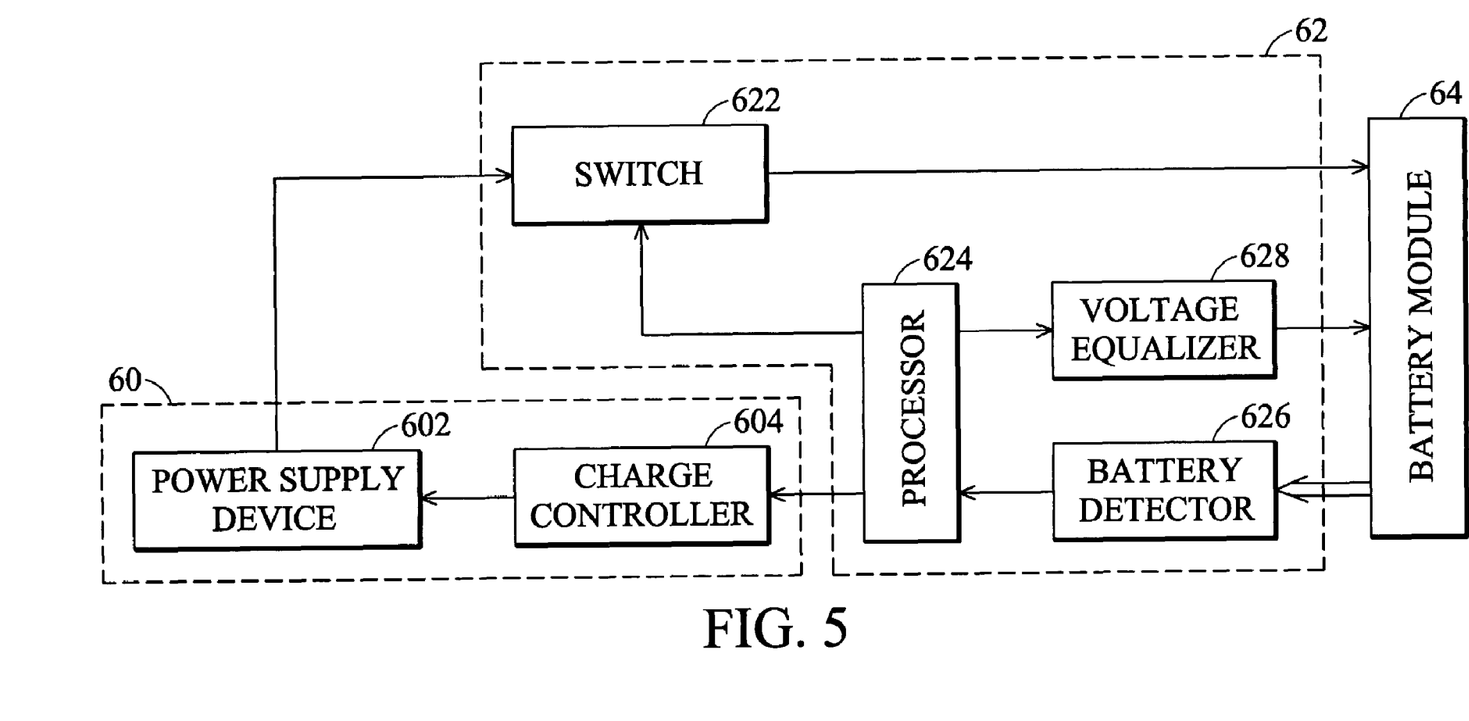
FIG. 5 is a block diagram of a charging system according to the embodiment of the present invention.

FIG. 5 is a block diagram of a charging system according to an embodiment of the invention. The charging system charges a battery module 64 comprising batteries connected in series. Each battery has a battery voltage level.

The charging system comprises a power supply 60 and a charge management circuit 62. The power supply circuit 60 outputs a charge voltage. The charge management circuit 62 is coupled between power supply 60 and a battery module 64 for conveying the charge voltage.

The power supply circuit 60 comprises a power supply device 602 and a charge controller 604. The power supply device 602 generates the charge voltage. The charge controller 604 controls the power supply device 602 for changing the charge voltage.

The charge management circuit 62 comprises a battery detector 626, a processor 624, and a switch 622. The battery detector 626 detects the status of each battery in the battery module 64. The battery status comprises battery voltage level, battery temperature, or current passing through the battery module. The processor 624 controls the charge controller 604 according to the status detected by the battery detector 626. The switch 622 is a transistor or relay for selectively conveying the charge voltage to the battery module 64.

For example, when the temperature of the battery module 64 detected by the battery detector 626 is out of range, the processor 624 changes the charge voltage via the charge controller 604 or turns off the switch 622 until the temperature comes back into normal range.

The principle of charging operation is shown in FIG. 5. In this embodiment the battery detector 626 detects each battery voltage level and the charge current passing through the battery module 64.

The processor 624 turns on the switch 622 such that the battery module 64 receives the charge voltage output from the power supply device 602. The battery detector 626 detects each battery voltage level. The processor 624 controls the charge controller 604 to change the charge voltage according to the result detected by the battery detector 626.

When a battery voltage level is greater than a first preset voltage, the processor 624 decreases the charge voltage via the charge controller 604 and continuously charges the battery module 64. Since the charge voltage is decreases, the corresponding charge current is also decreased.

The battery detector 626 detects the charge current through the battery module 64. When the charge current is less than a first preset current, the processor 624 increases the charge voltage via the charge controller 604 to increase the charge speed. At the same time, the processor 624 also reduces the first preset current. The battery detector 626 continuously detects each battery voltage level and the charge current for making adjustments accordingly. When the first preset current and the charge current are less than a second preset current, the battery detector 626 stops charging the battery module 64.

Figure 6:
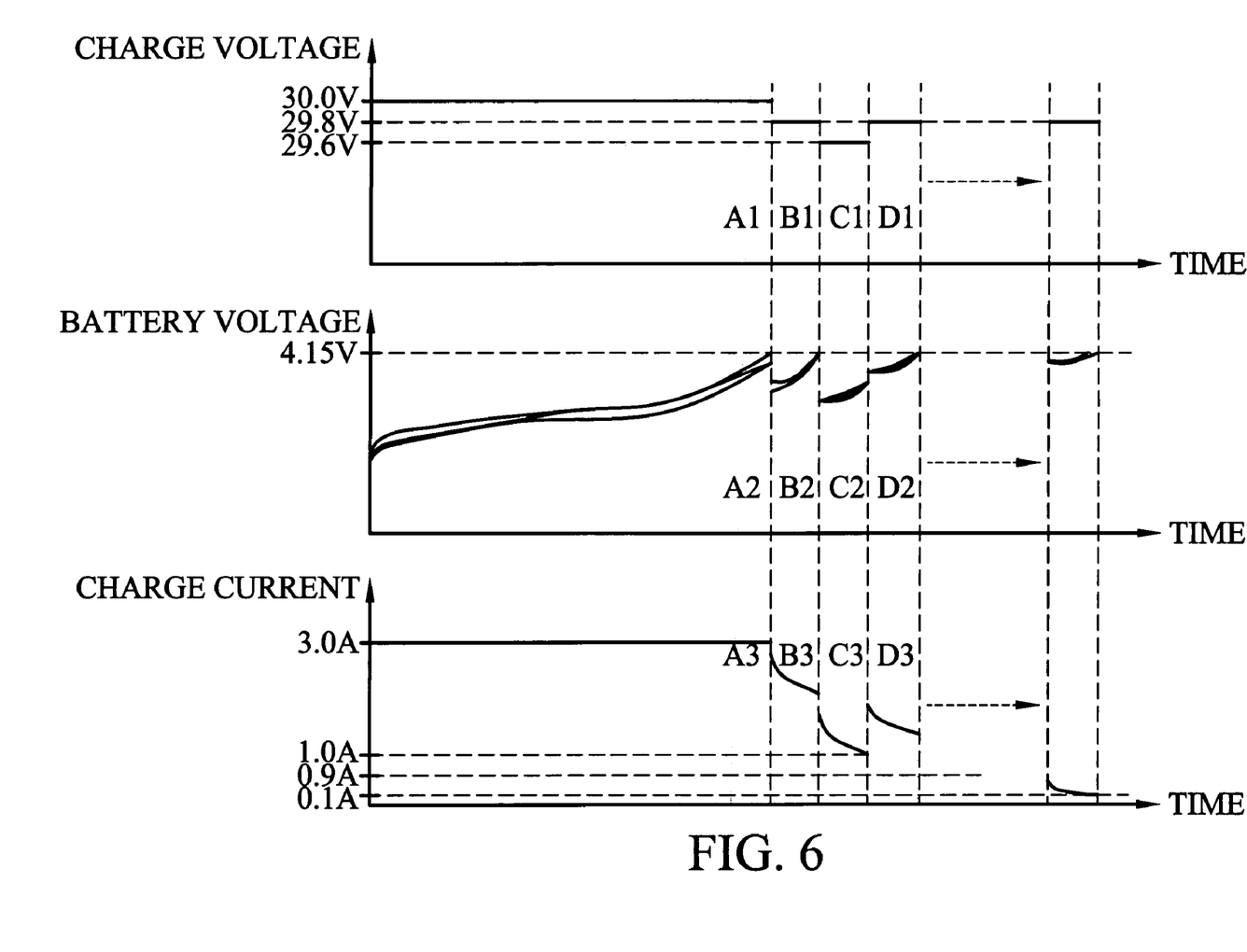
FIG. 6 is a timing chart of the charging method according to the embodiment of the present invention.

In order to fully charge each battery, the charging system further comprises a voltage equalizer 628 to balance each battery voltage level. The voltage equalizer 628, for example, provides a bypass path to direct charge current away from a battery that has a higher voltage than others, so that the battery is not charged while other batteries are charged. FIG. 6 is a timing chart of the charging method according to an embodiment of the invention. A voltage equalizer in the battery module is turned on such that the battery voltage levels are approximately equal. In this embodiment, the voltage equalizer is a resistor for discharging batteries having a higher voltage level. The charging method of this embodiment and equalizers thereof ensure that each battery is full charged.

The charging method is described in the following. In region A1, the charge voltage is 30V. Since the voltage difference between the total voltage of the battery module and the charge voltage is greater than a preset value, the charging method utilizes the limited-current charging method to charge the battery module as shown in region A3. In this embodiment, the initial charge current is 3 A. The battery voltage levels are gradually increased as shown in region A2.

When one battery voltage level is greater than a preset voltage of 4.15V, the charge voltage is reduced from 30V to 29.8V as shown in region B1. Thus, each battery voltage level and the charge current are reduced as shown in regions B2 and B3, respectively. When the battery voltage levels are slowly increased in region B2, the charge current is also slowly reduced in region B3. Since a wire between the power supply circuit 60 and the battery module 64 or the impedance of the switch 622 will cause a voltage drop, the battery voltage levels are not fixed.

When one battery voltage level is again greater than the preset voltage 4.15, the charge voltage is decreased from 29.8V to 29.6V as shown in region C1. Thus, the battery voltage levels and the charge current are decreased as shown in regions C2 and C3, respectively. In regions B1, C1, and D1, the charge voltage is changed such that the charge current and battery voltage levels have jumpily style.

When the charge current is less than a first preset current 1A, the charge voltage is increased from 29.6V to 29.8V as shown in region D1 for increasing charging speed. The battery voltage levels are increased as shown in region D2. Thereafter, the first preset current is decreased from 1 A to 0.9 A and the battery module continues charging. When one battery voltage level is greater than the preset voltage 4.15V, the charge voltage and the charge current are decreased again.

When the charge current is below the first preset current 0.9 A, the charge voltage is increased and the first preset current is decreased. In this embodiment, the second preset current is 0.1 A. When the first preset current and charge current are less than the second preset current 0.1 A, the battery module is fully charged and the charging process is complete. The decreased range of charge voltage and charge current are unlimited.

Figure 7A:
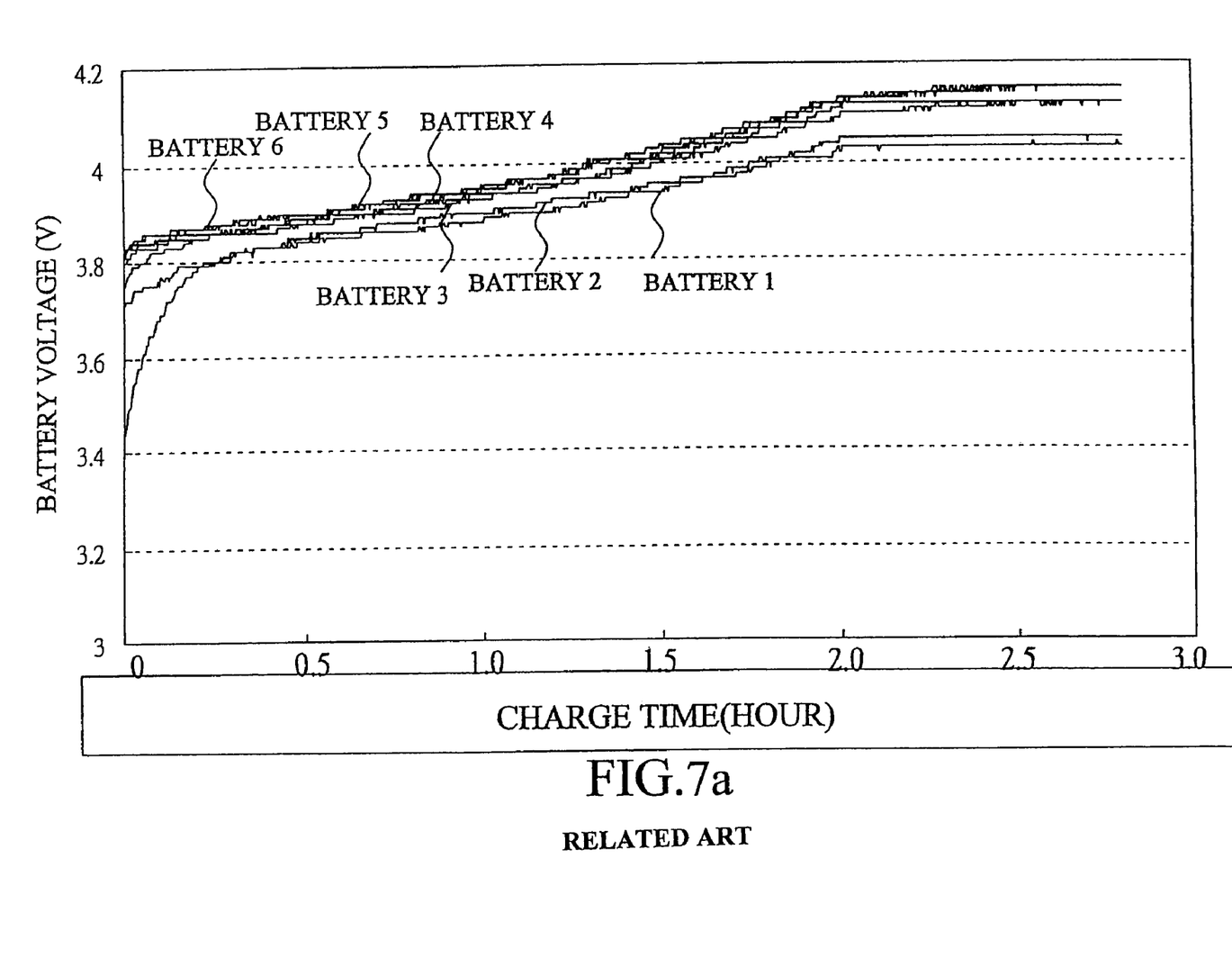
FIG. 7a shows a characteristic curve of a first conventional charger.

FIG. 7a shows a characteristic curve of a first conventional charger. The first conventional charger charges a battery module comprising batteries. Each battery has a battery voltage level. The first conventional charger does not have an equalization process for balancing the battery voltage level such that voltage differences between battery voltage levels are greater. Because the first conventional charger does not have a charge controller, when one battery voltage level reaches a preset voltage, the charger stops charging the battery module. Therefore one battery is fully charged and others are not.

Figure 7B:
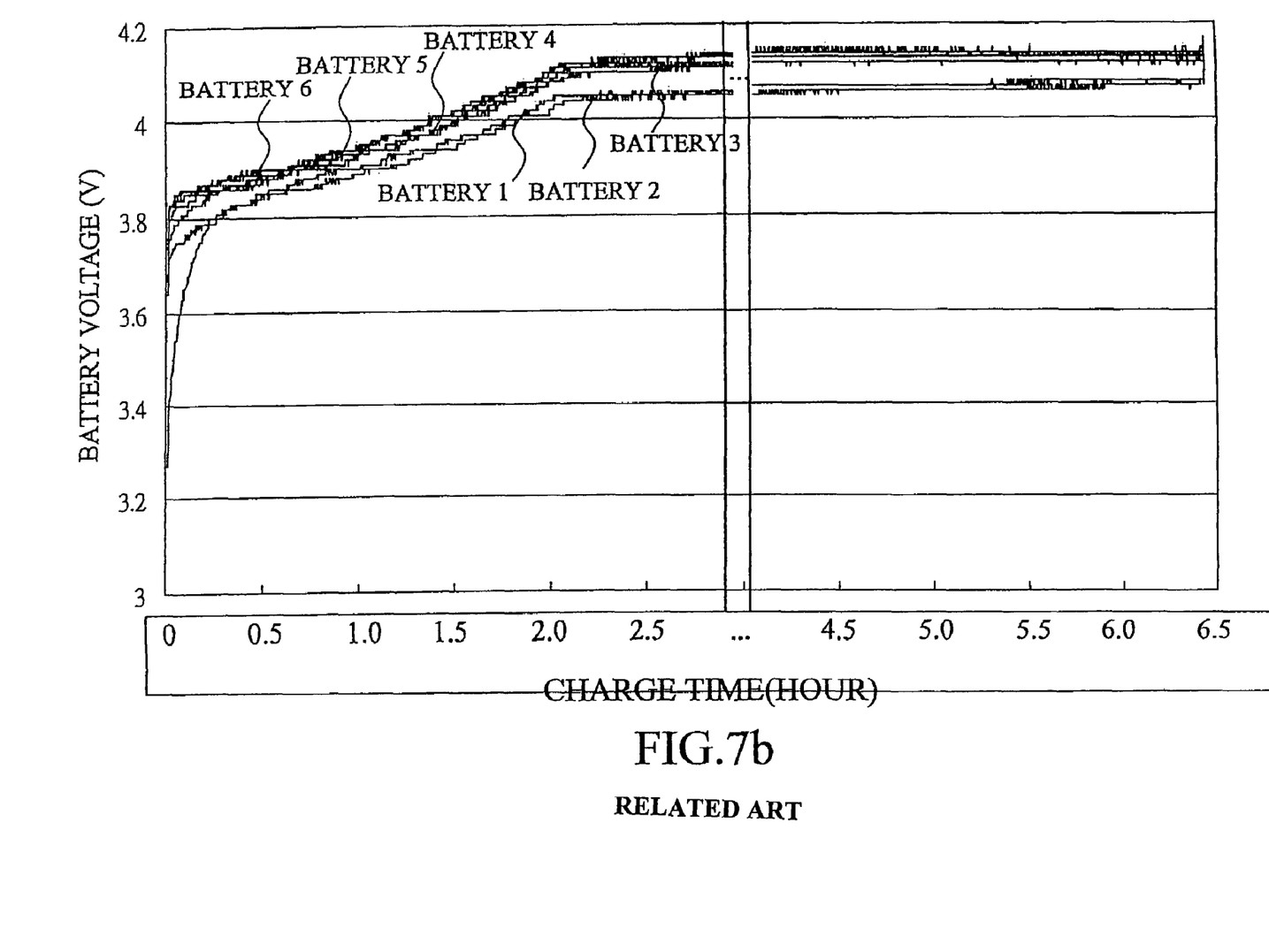
FIG. 7b shows a characteristic curve of a second conventional charger.

FIG. 7b shows a characteristic curve of a second conventional charger. The second conventional charger also charges a battery module comprising batteries. Each battery has a battery voltage level. The second conventional charger has an equalization process for balancing the battery voltage level such that the voltage levels of batteries are approximately equal. Since the battery module utilizing the second conventional charger does not have a charge controller, the battery module requires a longer charging period.

Figure 7C:
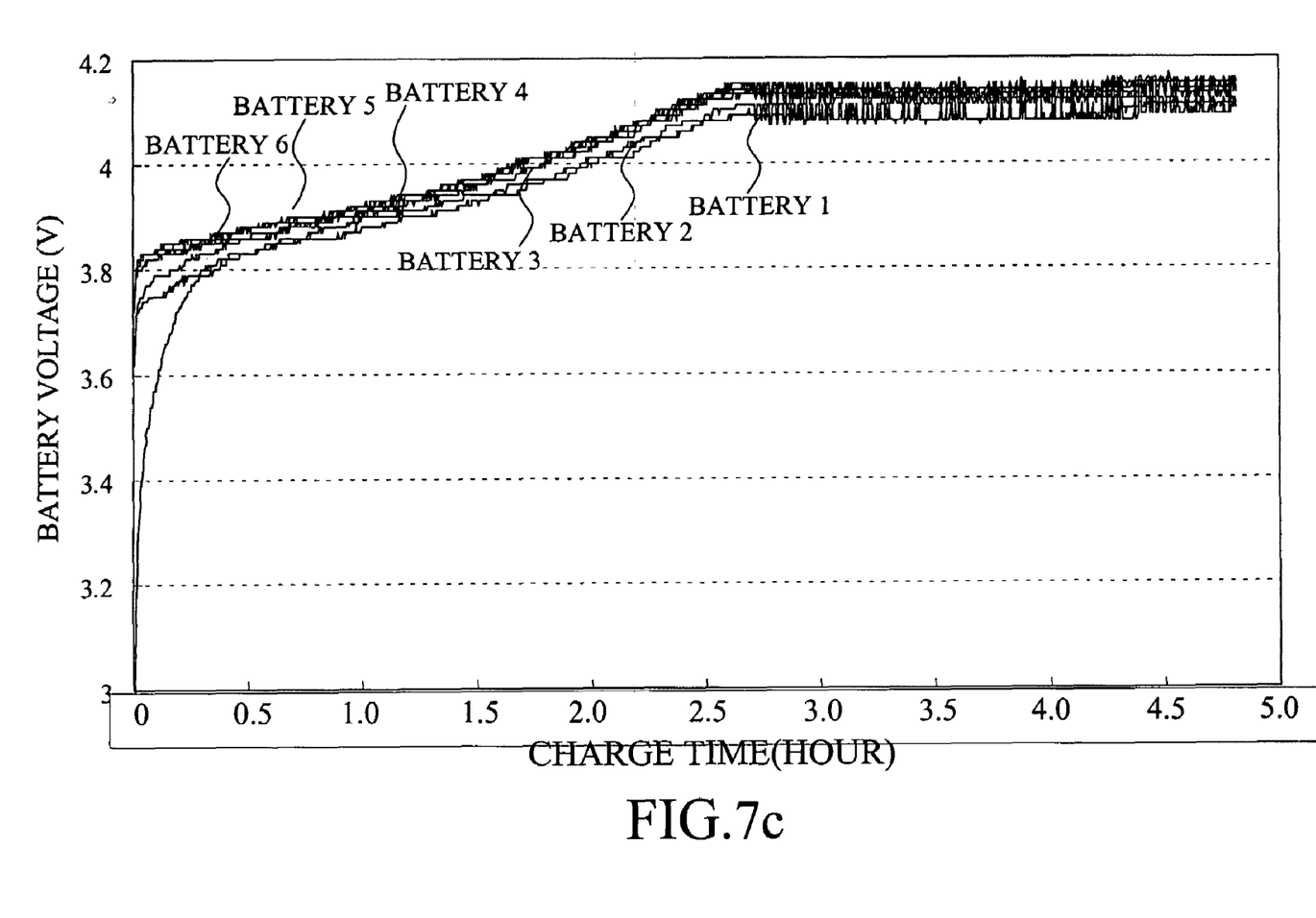
FIG. 7c shows a characteristic curve of a charger according the embodiment of the invention.

FIG. 7c shows a characteristic curve of a charger according an embodiment of the invention. The charger of this embodiment provides a charge voltage to a battery module comprising batteries. Each battery has a battery voltage level. The charger has an equalization process such that the battery voltage levels are approximately equal. Additionally, the charger has a charge controller for varying the charge voltage to accelerate and increase the charged-in capacity of the battery module.

The following table shows the comparison among the charging times and charged-in capacities of batteries:

TABLE 1

| | charging period | charged-in capacity of minimum battery voltage level |
|---|---|---|
| the first conventional charger | 2 hours and 47 minutes | 82% |
| the second conventional charger | 6 hours and 27 minutes | 95% |
| the charger of the embodiment | 4 hours and 48 minutes | 98% |

Although the charging period of the first conventional charger is shorter, only one battery is fully charged and then available energy in this module is lower than others. In the first conventional charger, the charged-in capacity of the minimum battery voltage level is 82%. In the second conventional charger, the charged-in capacity of the minimum battery voltage level is 95% but the charging period is longer. In the invention, the charged-in capacity of the minimum battery voltage level is 98% and the charge period is reduced.

The circuit design of the invention is simple. The charging circuit adjusts a charge voltage and charge current according to the statuses of the battery. With the charging circuit, the charged-in capacity of the battery module is increased and the charging period is reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging method for charging a battery module containing batteries connected in series, each battery having a battery voltage level, and the charging method comprising the steps of:

providing a step-constant charging voltage to charge the battery module for a period of time;

individually monitoring the batteries and obtaining respective battery statuses during charging of the battery module, wherein the battery voltage levels of the batteries and charge current passing through the battery module during charging are obtained;

reducing the step-constant charging voltage when one of the battery voltage levels is greater than a first preset voltage value and returning to step of providing the step-constant charging voltage;

increasing the step-constant charging voltage when each battery voltage level is less than the first preset voltage and the charge current is less than a first preset current;

returning to step of providing the step-constant charging voltage; and stopping charging of the battery module when one of the battery statuses meets a predetermined requirement.

2. The charging method as claimed in claim 1, wherein the step of varying the step-constant charging voltage further comprises a step of lessening the first preset current before going back to the step of providing the step-constant charging voltage.

3. The charging method as claimed in claim 2, wherein step of stopping charging the battery module is executed when the first preset current is less than a second preset current and the charge current is less than the second preset current.

4. The charging method as claimed in claim 1, further comprising a step of concurrently balancing all battery voltage levels in the battery module.

5. A charging system, for charging a battery module containing batteries connected in series, each battery having a battery voltage level, the charging system comprising:

a power supply circuit outputting a step-constant charging voltage; and a charge management circuit coupled between the power supply circuit and the battery module for conveying the step-constant charging voltage to the battery module, individually monitoring the batteries and obtaining respective battery statuses during charging the battery module; and varying the step-constant charging voltage according to the battery statuses;

wherein the charge management circuit detects each battery voltage level and charge current passing through the battery module and reduces the step-constant charging voltage when one of the battery voltage levels is greater than a first preset voltage value;

wherein the power supply circuit outputs increased step-constant charging voltage when each battery voltage levels is less than the first preset voltage and the charge current is less than a first preset current.

6. The charging system as claimed in claim 5, wherein the power supply circuit stops outputting the step-constant charging voltage to the battery module when one of the battery statuses meets a predetermined requirement.

7. The charging system as claimed in claim 5, further comprising a voltage equalizer to balance each battery voltage level in the battery module.

8. The charging system as claimed in claim 7, wherein the power supply circuit comprises:

a power supply device for generating the step-constant charging voltage; and a charge controller responsive to the charge management circuit for controlling the output voltage of the power supply device.

9. The charging system as claimed in claim 8, wherein the charge management circuit comprises:

a battery detector for detecting each battery voltage level in the battery module; and a processor controlling the charge controller according to the battery statuses detected by the battery detector.

10. The charging system as claimed in claim 9, wherein the charge management circuit comprises a switch for selectively conveying the step-constant charging voltage to the battery module.

11. The charging system as claimed in claim 10, wherein the processor reduces the first preset current when each battery voltage level is less than the first preset voltage and the charge current is less than a first preset current.

12. The charging system as claimed in claim 11, wherein the processor turns off the switch when the charge current is less than a second preset current.

13. The charging system as claimed in claim 10, wherein the battery detector further detects a temperature in the battery module, and wherein the processor turns off the switch when the temperature is greater than a preset value.

14. A charging method for charging a battery module containing batteries connected in series, each battery having a battery voltage level, and the charging method comprising the steps of:

providing a step-constant charging voltage to charge the battery module;

individually monitoring the batteries and obtaining respective battery voltage levels;

reducing the step-constant charging voltage when one of the battery voltage levels is greater than a first preset voltage value;

increasing the step-constant charging voltage when each battery voltage level is less than the first preset voltage and the charge current is less than a first preset current;

decreasing the first preset current after the charged voltage is increased; and stopping charging of the battery module when one of the battery statuses meets a predetermined requirement.

15. The method as claimed in claim 14, wherein the battery module is stopped charging when the first preset current is less than a second preset current.

16. The charging method as claimed in claim 1, further comprising a step of concurrently balancing all battery voltage levels in the battery module.

\* \* \* \* \*

UNITED STATES PATENT AND TRADEMARK OFFICE
CERTIFICATE OF CORRECTION

PATENT NO. : 7,633,269 B2  Page 1 of 1
APPLICATION NO. : 11/016718
DATED : December 15, 2009
INVENTOR(S) : Chou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 302 days.

Signed and Sealed this

Second Day of November, 2010

David J. Kappos
*Director of the United States Patent and Trademark Office*